United States Patent
Gossweiler (10) Patent No.: US 12,475,094 B2
(45) Date of Patent: Nov. 18, 2025

(54) METHOD FOR WRITING DATA SETS INTO A RELATIONAL DATABASE

(71) Applicant: BASICS SOFTWARE SOLUTIONS AG, Wollerau (CH)

(72) Inventor: Martin Gossweiler, Wollerau (CH)

(73) Assignee: BASICS SOFTWARE SOLUTIONS AG, Wollerau (CH)

( * ) Notice: Subject to any disclaimer, the term of this patent is extended or adjusted under 35 U.S.C. 154(b) by 0 days.

(21) Appl. No.: 18/497,544

(22) Filed: Oct. 30, 2023

(65) Prior Publication Data

US 2024/0152497 A1    May 9, 2024

(30) Foreign Application Priority Data

Oct. 31, 2022  (CH) .................. 001285/2022

(51) Int. Cl.
G06F 16/28  (2019.01)
G06F 16/22  (2019.01)

(52) U.S. Cl.
CPC ............ *G06F 16/22* (2019.01); *G06F 16/284* (2019.01)

(58) Field of Classification Search
CPC ............................... G06F 16/22; G06F 16/284
USPC ......................................................... 707/741
See application file for complete search history.

(56) References Cited

U.S. PATENT DOCUMENTS 7,668,804 B1 * 2/2010 El-Helw ............ G06F 16/217
                                                707/719
8,161,081 B2   4/2012 Kaufman et al.
2009/0019005 A1 * 1/2009 Hu .................... G06F 16/24539
2018/0004782 A1   1/2018 Greenwood et al.

OTHER PUBLICATIONS

OraDBAdm: Oracle® Database Administrator's Guide 12c Release 2 (12.2) E85760-May 9, 2020 (Year: 2020).*
OraDBAG: Oracle® Database Administrator's Guide 12c Release 2 (12.2) E85760-May 9, 2020 (Year: 2020).*
OraMView: Comparing Materialized Views and Analytic Workspaces in Oracle Database 11g An Oracle White Paper Mar. 2008 (Year: 2008).*
Christian Reinboth, "Basis of Statistics: What is the difference between discrete and continuous characteristics—and when can characteristics be clustered?", Sep. 29, 2016, 10 pages (including English machine translation). <https://wissenschafts-thurm.de/grundlagen-der-statistik-worin-unterscheiden-sich-diskrete-und-stetige-merkmale-und-wann-sind-merkmale-haeufbar/>.

* cited by examiner

*Primary Examiner* — Kuen S Lu
(74) *Attorney, Agent, or Firm* — Mannava & Kang, P.C.

(57) ABSTRACT

A method for writing data sets (DS) into a relational database (13), wherein each data set (DS) comprises at least two attributes (A), includes the steps of: determining at least one value for at least one of the attributes (A1) as criterion for filtering the data sets (DS) by the attribute value; computer implemented outputting data sets (DS) filtered by the attribute value in an output view (AS) and providing an input field (EF) in the output view (AS) for entering a value for another one of the attributes (A4); in response to entering a value in the input field (EF) of the output view (AS) computer implemented generating a complete data set (DS4) including the value set as filter criterion for the corresponding attribute (A1) and the entered value for the other attribute (A4); and storing the generated dataset (DS4) in the relational database (13).

10 Claims, 5 Drawing Sheets

| PROJEKT | |
|---|---|
| 870 | Repair Valley Rd. |
| 871 | Clean Mount. Rd |
| 872 | Crane Work East Str. |
| 874 | Excavator Work West Str. |
| 875 | Tar Work East Str. |

FIG. 4

| STAFF MEMBER |
|---|
| F. Meier |
| A. Huber |
| X. Müller |
| B. Reichelt |
| U. Lüthi |

FIG. 5

| | PRODUKTION | | | |
|---|---|---|---|---|
| A1 | 12.05.2022 | 12.05.2022 | 13.05.2022 | .... |
| A2 | Repair Valley Rd. | Clean Mount. Rd. | Clean Mount. Rd. | .... |
| A3 | F. Meier | A. Huber | B. Reichelt | .... |
| A4 | 6.5 | 3.5 | 7.5 | .... |
| PS | hdgztZ6738 | h56296738t | uuztrfrkll | .... |
| | DS1 | DS2 | DS3 | DS4 |

| PRODUCTION | | |
|---|---|---|
| PROJECT | STAFF MEMBER | WORKING HOURS |
| Repair Valley Rd. | F. Meier | 6.5 |
| Clean Mount. Rd | A. Huber | 3.5 |
| | | |

EF    FIG. 7    AS2

PRODUCTION — 12.05.2022

| PROJECT ▽ | STAFF MEMBER ▽ | WORKING HOURS |
|---|---|---|
| Repair Valley Rd. | F. Meier | 6.5 |
|  |  |  |
|  | Σ | 6.5 |
| Clean Mount. Rd. ▽ | Huber ▽ | 3.5 |
|  |  |  |

PRODUCTION — 12.05.2022

| | STAFF MEMBER ▽ | | |
|---|---|---|---|
| | F. Meier | A. Huber | Σ |
| PROJECT | Working Hours | Working Hours | |
| Repair Valley Rd. | 6.5 |  | 6.5 |
| Clean Mount. Rd. |  | 3.5 | 3.5 |
|  | Σ 6.5 | Σ 3.5 | 11 |

| | | PRODUCTION | | | |
|---|---|---|---|---|---|
| A1 | 12.05.2022 | 12.05.2022 | 13.05.2022 | *12.05.2022* | *12.05.2022* |
| A2 | 870 | 871 | 871 | 871 | 870 |
| A3 | F. Meier | A. Huber | B. Reichelt | F. Meier | A. Huber |
| A4 | 6.5 | 3.5 | 7.5 | 1.5 | 4.5 |
| PS | hdgztZ6738 | h56296738t | uuztrfrkll | Jhhzdd87hi | gtrr5533hh |
| | DS1 | DS2 | DS3 | DS4 | DS5 |

METHOD FOR WRITING DATA SETS INTO A RELATIONAL DATABASE

PRIORITY

The present application claims priority under 35 U.S.C. 119(a)-(d) to Swiss Patent Application 1285/2022, filed Oct. 31, 2022, which is incorporated by reference in its entirety.

FIELD OF THE INVENTION

The invention relates to a method for writing data sets into a relational database. The invention further relates to a computer system and to a computer program.

BACKGROUND OF THE INVENTION

Writing data sets into a relational database may be cumbersome. In case a data set consists of x attributes, a user is required to type x entries for each new data set.

BRIEF SUMMARY OF THE INVENTION

Hence, it is an object of the present invention to provide a method for writing data sets into a relational database which is more efficient.

This object is solved by a method according to claim 1. In this method, a relational database comprising multiple relations is either provided or is generated. The basic structure of the database is yet existent or is generated in a first step. Preferably, the relational database is yet filled with a couple of datasets. However, this is not mandatory. In the following, a user may trigger the display of possibly yet existing data sets. The presentation of the data sets makes use of an output view which can preferably be selected by the user. In a preferred embodiment, the output view may even be configured by the user. In the first variant the user may e.g. select one of multiple output views suggested by the computer system. In the second variant the output view may e.g. be determined with the aid of a computer implemented assistant. Alternatively, the output view may be determined by the system/the software, preferably as a matrix view.

A filter criterion is determined for displaying the desired data sets. This means that not necessarily all datasets are displayed in the output view but rather only those datasets that fulfil the filter criterion. Data sets, and preferably a primary relation of the relational database, comprise x attributes each, preferably two or more attributes, preferably four or more attributes. Presently, a filter operation may be performed on at least one of the attributes. In case the filter attribute is set to a defined value, only those datasets out of the multitude of stored datasets will be displayed in the output view that fulfil the filter criterion. In an embodiment, a single attribute is used as filter criterion. In another embodiment, two attributes are used as filter criteria. Even more filter criteria may be applied. In an embodiment, the user can define the value of the attribute to be used as filter, e.g. by selecting from a limited set of values admitted for the corresponding attribute, which admitted values may be suggested to the user by the system. In another embodiment, the user may not only define the value of an attribute as filter criterion, but may also determine the attribute that shall serve as filter. In this context the system may also offer support in that only the existing attributes and/or the attributes admitted for filtering are presented to the user. This support preferably is implemented via a suitable GUI.

After the one or more filter criteria are determined, preferably by way of user interaction, existing datasets are filtered according to the filter criteria, and the filtered data sets are displayed in the output view. Typically, the filtered data sets are presented only with the values of the remaining attributes, i.e. the values of all attributes except for the filter attribute. The attribute value serving as filter may be displayed elsewhere in the output view, and at least is temporarily stored given that it will be needed later on.

The data sets filtered in this way are computer assisted output in a predefined output view, preferably on a screen of a user computer. It is emphasised that the output view not only is of passive nature, i.e. not only displays the filtered data sets. Rather the output view comprises editing functionality in form of at least one input field, and preferably more than one input field. A number of input fields to be used for entering values to be assigned to one or more data sets is referred to as input mask in the following. An input field or input fields of an input mask are generated computer assisted and are displayed in the output view. An input field serves for entering a value for one of the attributes. Multiple input fields associated with the same data set serve for entering values for multiple attributes.

In the output view it may be determined that the input field for an attribute at the same time is assigned to a value of a different attribute or even to values of multiple other attributes. In case the output view is a matrix view comprising rows and columns, and in case the rows are represented by values of one attribute, the columns are represented by values of a different attribute, and the cells of the matrix view represent a further attribute, entering a value in a cell characterized as input field preferably results in an automatic assignment of the entered value to the entries in the corresponding column and in the corresponding row, and hence is assigned to the values of two additional attributes, all contributing to the same data set.

In response to a user entering a value into at least one input field of the output view a new dataset is computer assisted generated, i.e. automatically. The new data set comprises at least the entered value and the value defined as filter criterion. The data set may be completed by additional value/s for one or more additional attributes. In particular in case the specific output view assigns the entered value to further attributes, such further attribute values complete the data set. The data set generated in this way is stored in the relational database.

In case a data set in a relational database comprises x attributes with x>1, and preferably x>3, the user does not need to enter the values for all x attributes for generating a new data set, but only for x−1 attributes at most, preferably only for x−2 or x−3 attributes, and most preferably only for a single attribute. Setting the filter criterion is not considered as entering an attribute value. Generally it can be asserted that because of the prior filtering of data sets and/or the assignment of input fields in the output view to values of other attributes, the number of real entries to be typed or selected by the user decreases by the number of filtered attributes and the number of further attributes assigned to an input field by way of arrangement in the output view, since the values of these further attributes can automatically be assigned to the entered attribute value/s and, hence, complete the data set automatically.

The method and the corresponding computer program product offer the possibility to the user to generate data sets for a relational database easily and intuitively, by way of "inline-edits" in an output view, which output views conventionally are of read-only characteristics, i.e. which output views conventionally only present data sets, but do not offer the possibility to edit or enter values of data sets. By such means, not only is the effort diminished for entering or editing datasets and time is saved in maintaining the relational database. In addition, error-proneness is reduced since the user is not required to enter all attribute values of a data set, which reduces typos.

In preferred embodiments of the invention, not only can a new data set be generated by the mechanism introduced above. Even existing data sets may be amended or be deleted. For doing so, it is required that in the output view the attribute values of the filtered data sets that are otherwise displayed as read-only attribute values are also configured as editable input fields the values of which fields may be deleted and/or be amended by the user. In analogy to generating a data set, deleting a value from an editable field has the consequence that the corresponding data set is removed computer assisted. For example, prior to deleting a value of an attribute, its primary key value may be determined or looked up, which may also depend on the value used as filter criterion and/or values of further attributes assigned by way of the specific output view. In response to deleting a value in such input field, the corresponding primary key value may be searched in the database and the corresponding data set may be deleted. In response to amending a value the corresponding data set may be determined in the same manner, the value of the respective attribute may be amended and stored, and a new primary key value may be calculated and stored accordingly. Deleting a value may also not necessarily lead to a deletion of the corresponding data set from the database. Instead, the respective value may be set to "zero" according to the mechanism introduced above for amending a value.

In a preferred embodiment of the invention, a data set newly generated in this way only is stored in the relational database in case a comparison with the data sets already stored in the relational database does not show a full or partial identity. Else it is communicated to the user, preferably via the output view, that the data set generated based on the entered value cannot be stored in the relational database, e.g. because of a full or partial identity with an already stored data set.

The necessity of verifying full or partial identity may depend on the functionality of the specific database. Preferably, the relational database comprises relations, one of which relations is a primary relation with at least two attributes. Additional relations may exist, and may also comprise foreign keys. Data sets preferably comprise all attributes defined in the primary relation and are represented by a tuple of values for these attributes. Preferably, the primary relation comprises a primary key in addition to the attributes. The primary key is meant to identify the corresponding data set. Insofar it is preferred that the primary key is used for fully or partially verifying the new generated data set against already stored data sets.

For example, the primary key is a combined primary key across a number of attributes of the primary relation. By this means, biunique identity of data sets is ensured in case the comparison results in a hit. In a preferred embodiment, the primary key also is a combined key, though built only across a subset of attributes of the data sets. In one example, attributes of the primary relation are date, project, staff member and working hours. The data sets, hence, are configured to show the work assignments of staff members in a company. The primary key preferably is built from the attributes date, project and staff member, i.e. a subset of the attributes given that the attribute working hours is not part of the primary key. By means of such primary key, partial identity can be verified in that only a single data set is allowed per staff member, project and day. The staff member may be assigned to different projects on the same day, such that an additional data set may be generated for such scenario. However, two data sets for the same project for the same staff member on the same day are not permitted.

In a very preferred embodiment, and with reference to the filtering, to the output views and to the primary key function, the attributes of the primary relation, are defined such that the verification of identity of data sets delivers unambiguous results. At the same time, the output view including the input functionality provides unambiguous assignments in the generation of new datasets as described. In addition, the primary key provides unambiguous values. Accordingly, in this embodiment of the present invention it is distinguished between a data type with discrete features or values, and a data type with non-discrete features or values. A data type with discrete values is considered a data type wherein the attribute comprises only a countable number of values, however, which number may in one example, be infinite. These restrictions are not fulfilled for a data type with non-discrete values or continuous values.

In the following, a data type with discrete values is referred to as discrete data type. An attribute of the discrete data type preferably is defined by way of a relation comprising an unambiguous, countable and infinite set of values. In the above example, e.g. a list of all staff members of the company, or a list of all current projects of the company represent attributes of the discrete data type. These examples illustrate that such list may comprise text such that text may be defined as data type with "quasi-continuous" features/values. By way of restricting the relation to a discrete data type, text/string becomes a discrete data type given that a relation defines an exactly defined number of attribute values and its syntax. Presently, integer numbers, boolean numbers, date, etc. are considered as attributes of the discrete data type. On the other hand, floating points, fractions or free text/strings are of the continuous or quasi continuous data type given that the number of values these attributes can take is infinite. In the following, a data type including continuous or quasi-continuous features is referred to as non-discrete data type. In the above example, the attribute working hours is a floating point number and hence, is of the non-discrete data type.

Accordingly, it is preferred that the primary key—in case of being implemented as combined key—solely includes attributes of the discrete data type. It is also preferred to use and/or select only attributes of the discrete data type for rows and/or columns in an output view. It is further preferred to admit only one or more attributes of the discrete data type for implementing filter functions.

Preferably, the primary relation, and preferably a data set, comprises at least one attribute of the discrete data type and at least one attribute of the non-discrete data type. However, it is preferred that multiple attributes of the primary relation, respectively its data sets, are of the discrete data type: The filter above mentioned preferably filters by an attribute value that is a discrete value, i.e. an attribute value that includes a predefined number of unambiguous values, in order to implement a reasonable filter criterion. When it comes to the output view it is also preferred to use attribute values of the discrete data type in rows and/or columns of the output view, and, hence, achieve an unambiguous assignment of input values entered in the input fields to these attribute values serving as columns and/or rows. However, cells of a matrix view, and/or other input fields may be either of the discrete data type or of the non-discrete data type. It is further preferred to assign only attributes of the discrete data type to the primary key, and preferably to the combined primary key.

Focusing on the matrix view as preferred output view, it is preferred to provide at least or exactly three attributes of the discrete data type, and at least or exactly one attribute of the non-discrete data type. Preferably, the primary relation comprises at least four attributes, wherein exactly one attribute of the primary relation requires values of the non-discrete data type, and all other attributes require values of the discrete data type.

In particular in the matrix view, the filter attribute preferably is of the discrete data type, a further attribute is of the discrete data type the values of which further attribute define the columns of the matrix, a third attribute is of the discrete data type the values of which third attribute define the rows of the matrix. Values of a fourth attribute of the non-discrete data type populate the cells of the matrix and are assigned each to a value defining the assigned column and assigned row of the data set. Preferably, all cells of the matrix that do not show an attribute value of the non-discrete data type are embodied as input fields.

In a preferred embodiment of the invention, the output view is not predefined. Instead, the user is offered a graphical editor in form of a GUI (Graphical User Interface) by which GUI the user can define the output view. For example, a basic appearance of the output view can be selected first in the editor, e.g. a table view or a matrix view. In case of the matrix view, a list of all attributes of the table appears ion the GUI and the user may assign such attributes to the components of the output view, i.e. the rows and/or the columns, e.g. by a drag and drop operation. It is preferred that only attributes of the discrete data type are offered to the user for an assignment to the rows and columns. The software of the output view editor then arranges the values of the selected attributes computer implemented e.g. as columns. This approach in particular increases flexibility for the user. He/she may select his/her preferred output view, or may select a standard output view dependent on the number of attributes. In this way, the user may generate a matrix, a table, field links and views. Each table may include one or more views. A view may include one or more filters, none or multiple row groups, none or multiple columns groups. The invention allows the user to simply and intuitively generate a view which conceptually corresponds to a matrix rather than to a table.

In the matrix view, row groups and column groups may be defined subsequently. In a row group view the filtered data sets are grouped according to one of the attributes in row groups, i.e. underneath each other, e.g. separated by a small distance. I.e. a first row group comprises all data sets comprising a first value of the attribute. A second row group comprises all data sets comprising a second value of the attribute, and so on. In the output view, input fields or an input mask may be assigned per row group. Accordingly, when entering a value in in input field assigned to a row group, the value of the attribute defining the specific row group assigned to this input field is defined as value of the new/generated data set. After having defined column groups, the filtered data sets are grouped according to one of the attributes in column group, i.e. laterally next to each other, e.g. separated by a small distance. I.e. a first column group comprises all data sets comprising a first value of the attribute. A second column group comprises all data sets comprising a second value of the attribute, and so on. In such output view input fields or an input mask may be assigned per column group. Accordingly, when entering a value in in input field assigned to a column group, the value of the attribute defining the specific column group assigned to this input field is defined as value of the new/generated data set.

According to a further aspect of the present invention, a computer program product is provided comprising computer program code implementing the following steps when executed on a processing unit for writing data sets comprising at least two attributes into a relational database comprising relations with at least one attribute each: Receiving a value for at least one of the attributes as a criterion for filtering the data sets for this attribute value; filtering the stored data sets by the received attribute value; composing the filtered data sets in an output view comprising an input field for entering a value for a different attribute; in response to entering a value in the input field of the output view generating a complete data set including the value defined a filter criterion for the respective attribute and the entered value for the different attribute; and storing the generated data set in the relational database.

According to a further aspect of the present invention, a computer system is provided comprising a relational database with relations comprising at least one attribute, a processing unit, and a computer program product according to the previous aspect.

Further embodiment of the present invention are defined in the dependent claims. The dependent claims referring to the method may at the same time refer to the other aspects—computer program product and computer system—and are considered as disclosed also with respect to these other claim categories.

BRIEF DESCRIPTION OF THE DRAWINGS

Embodiments of the present invention are presented in the following detailed description. Such description makes reference to the annexed drawings, wherein.

DETAILED DESCRIPTION OF THE INVENTION

Figure 1:
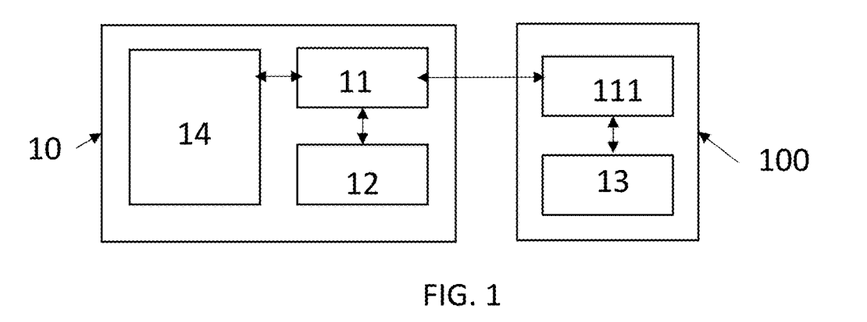
FIG. 1 illustrates a block diagram of a computer system according to an embodiment of the present invention.

FIG. 1 illustrates a block diagram of a computer system according to an embodiment of the present invention. The computer system comprises decentralized components such as a computer 10 and a server 100 remote from the computer 10, for example the server 100 of a cloud. Computer 10 and server 100 are communicatively coupled as is depicted by means of the arrow. The computer 10 comprises a processing unit 11, a display 14 and a storage in which a computer program 12 is stored. The computer program 12 implements a method according to an embodiment of the present invention if executed by the processing unit 11. Output views including input fields or input masks as used in embodiments of the method are displayed on the display 14. The server 100 also includes a processing unit 111, as well as a storage in which a relational database 13 is stored which relational database 13 is processed, in particular written according to the method according to an embodiment of the present invention.

Figure 2:
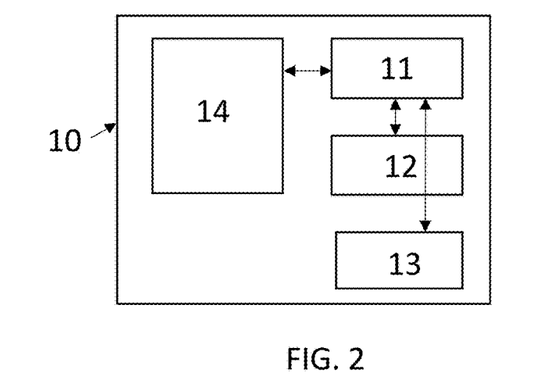
FIG. 2 illustrates a block diagram of a computer system according to another embodiment of the present invention.

FIG. 2 illustrates a block diagram of an alternative computer system according to an embodiment of the present invention. Here, the relational database 13 is stored in the storage of the computer 10. Hence, this computer system is not a distributed computer system but is implemented locally at the user.

Figure 3:
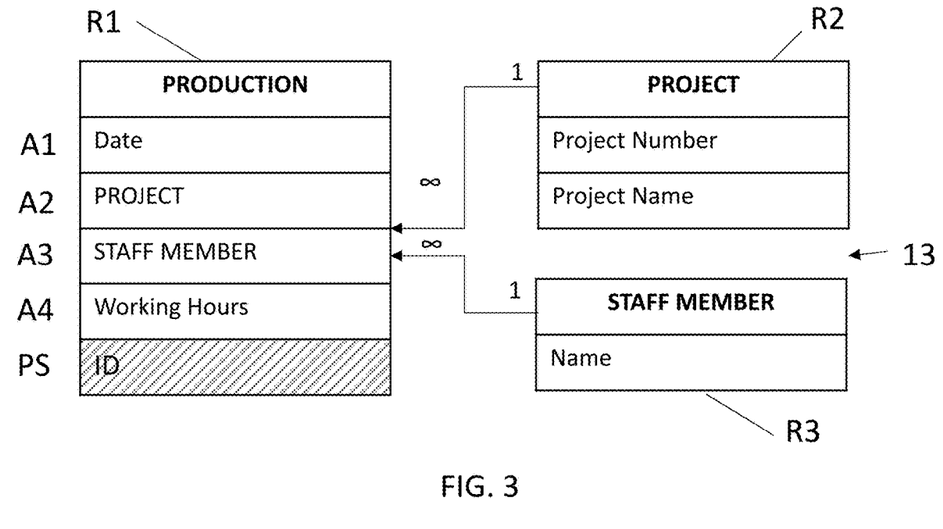
FIG. 3 illustrates schematic diagram of a relational database for usage in a method according to an embodiment of the present invention.

FIG. 3 illustrates a schematic view of a relational database for usage in a method according to an embodiment of the present invention. The relational database presently includes three relations R1 to R3. Of course, many more relations may be implemented. As is well known, relations of a relational database represent tables which are linkable with each other via relations. Presently, the first relation R1 referred to as primary relation R1 comprises four fields A1 to A4, also referred to as attributes. The attributes are A1 date, A2 project, A3 staff and A4 working hours. The name of the primary relation R1 is "production" and finally shall record the project related activities of the staff members in hours per day. Accordingly, this primary relation R1 comprises—if filled by entries—a multitude of data sets, each of which data sets logging the project related activity of a staff member per day. Each data set presently comprises four values, i.e. a value per each of the attributes A1 to A4. The attributes A2 and A3 are also denoted as foreign keys given that they are linked to additional relations R2 and R3.

The primary relation R1 additionally comprises a (shaded) field referred to as primary key PS. The primary key PS is used for identifying the specific data set. E.g. it can be assured by means of the primary key PS that the primary relation R1 does not contain any two identical entries. Accordingly, the specific value of the primary key PS serves as an identifier for a data set, which specific identifier ID is also referred to as primary key value. In output views of entries/data sets of the relational database the primary key values typically are not displayed. Presently, the primary key PS is not considered as attribute. However, the primary key PS preferably is a combined primary key composed from attributes, presently from attributes A1 to A3. Accordingly, the primary key PS ensures that a staff member only may have a single entry per day per project.

The additional relations R2 "project" and R3 "staff member" contain information on projects and staff members. For example, the names of all staff members are recorded in relation R3 the activities of which staff members shall be documented by means of the relational database. The relation between the third relation R3 and the primary relation R1—as is indicated by means of the arrow—ensures that the third attribute A3 of the primary relation may only be written by one of the values defined for the third relation R3. In fact, the data type of the attribute of the third relation R3 primarily is text given that each staff member is recorded by name and sure name. However, the entries in R3 represent a finite and well defined amount of entries consisting of predefined names, such that the data type presently is considered as discrete data type. A discrete data type is characterized by solely accepting predefined values out of a finite range of values.

The same holds for the relation R2. The relation R2 comprises two attributes "number" and "project name". These two attributes are also of discrete data type given that they are predefined and limited in the range of values. A project number is assigned to each project name.

Accordingly, the convention for the attributes A2 and A3 of the primary relation R1 is that they can only accept values from the assigned relations R2 and R3.

Figure 4:
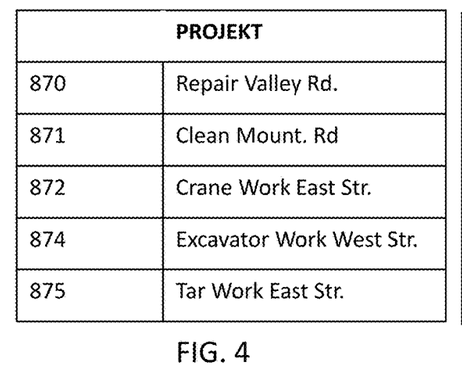
FIGS. 4 to 6 illustrate examples of specific relations in the relational database of FIG. 3.
Figure 5:
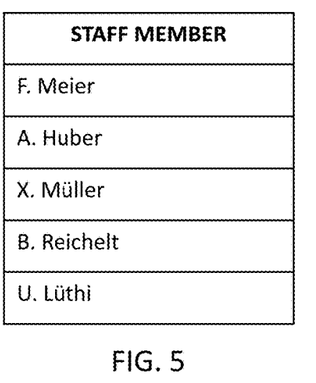
Figure 6:
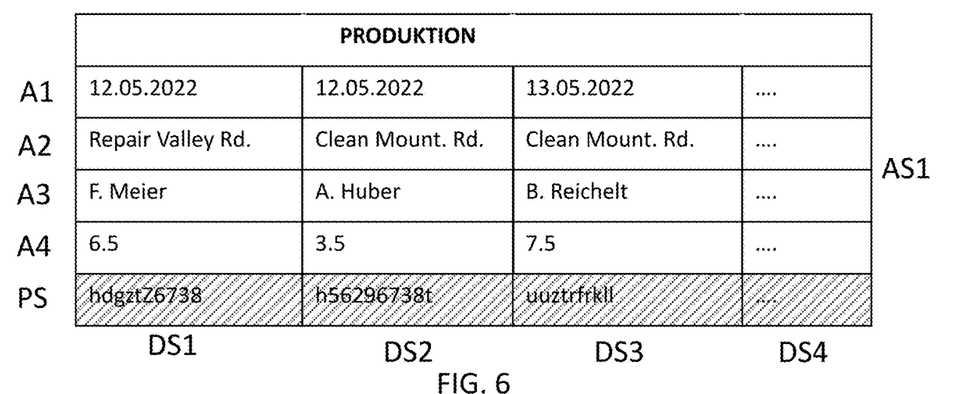

In FIGS. 4 to 6, examples are illustrated for relation R2 (FIG. 4), R3 (FIG. 5) and R1 (FIG. 6) of the relational database of FIG. 3, now filled with specific values. For example, the company activities to be displayed and documented comprise five staff members according to relation R3 of FIG. 5, and five projects/job assignments for the staff members according to relation R2 of FIG. 4. FIG. 6 illustrates an exemplary specific primary relation R1 comprising three data sets DS1 to DS 3. These data sets DS1 to DS3 illustrate the job assignments of three different staff members of R3 at two different working days in two different projects of R2. In addition, the values of the primary keys PS assigned to the data sets DS1 to DS3 are illustrated. A fourth data set DS4 is illustrated schematically representing of a multitude of additional data sets typically comprised in such a database.

Generally, the primary relation R1 including its entries may be displayed to the user on display 14. The relation of FIG. 6 may also be used as output view AS absent the primary key PS. This is indicated in FIG. 6 by reference sign AS1 representing a first embodiment of an output view AS. The specific output view AS1 is also referred to as "data grid" given that all attributes of all data sets are displayed. In this specific example it shall be assumed that the database only includes the three data sets DS1 to DS3 which are displayed in the output view AS1. The output view may be configured such that the fields referred to by DS4 are used as input fields, collectively referred to as input mask, again absent the field for the primary key the entry for which primary key preferably is derived from the other attributes A1 to A4. Hence, the user may generate a new data set DS4 by entering the four attributes A1 to A4 in the output view AS1. Accordingly, he/she enters a new dataset DS4 which subsequently is written and stored in the relational database.

Figure 7:
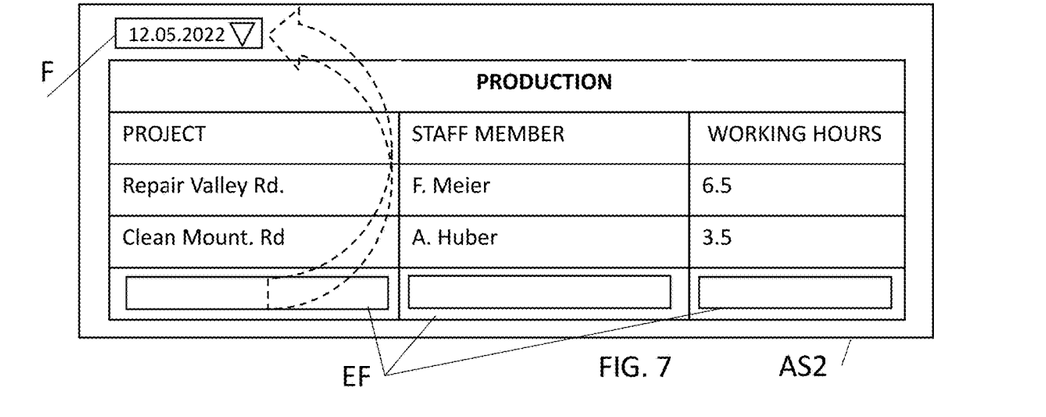
FIGS. 7 to 10 illustrate exemplary output views for a relational database as used in a method according to an embodiment of the present invention.

FIG. 7 illustrates a further output view AS2 for displaying relational data sets of the relational database. However, in this output view AS2 only data sets are displayed that are filtered for a specific value of one of the attributes, presently attribute A1, i.e. "date". The filter F may be set by means of a suitable input mask, e.g. by means of a drop down menu or by means of selecting from an overlaid calendar or by means of manual input. The input shall assure that the data type convention for this attribute A1 is complied with. In the present example, the filter F is set by the user to the date "May 12, 2022". As a result, only those data sets are displayed in the in the rows of the output view AS2 according to FIG. 7 which comply with the filter criterion. Only the remaining three attributes "project", "staff member" and "time" are displayed. According to an embodiment of the present invention, an input mask is generated in such an output view. The input mask is represented by the three input fields EF as shown in FIG. 7. The input fields EF are assigned to the attributes A2, A3, A4 by way of arrangement. If the user enters values in these three input fields he/she can generate a new data set DS4. Upon generating the new data set, the entered values are assigned to the attributes A2 to A4. The remaining attribute A1 "date" is automatically set to/by the filter value. This is indicated by means of the dashed arrow. The value "May 5, 2022" is assigned to attribute A1 and therefore completes the new data set DS4.

Accordingly, in this output view AS2 the user only needs to enter three values by hand for generating a complete new data set in comparison to four input values required in the output view AS 1 of FIG. 6. The input effort is reduced to three attributes instead of four attributes. Owed to the previous filtering of data sets and the display of the filtered data sets in an output view to which output view an input mask is assigned, the number of entries to be accomplished by the user is reduced at least by the number of filtered attributes since the values of the filtered attributes can automatically be assigned to the values entered for the remaining attributes, and, hence, complete the new data set.

Figure 8:
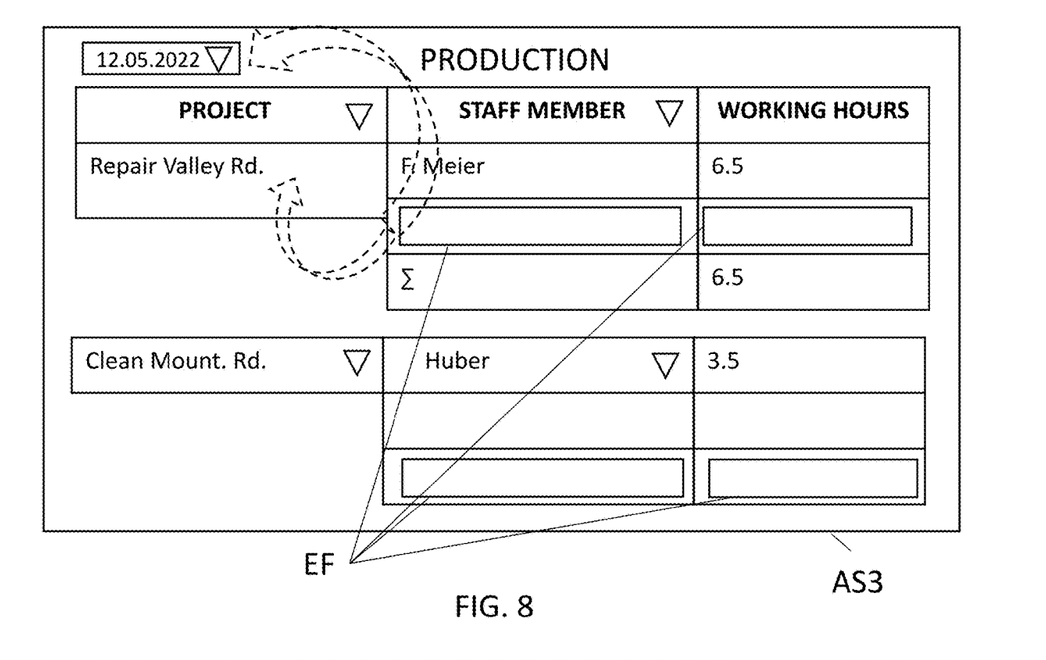

The output view AS3 as shown in FIG. 8 is a so-called line or row group view. Again, attribute A1 is the filter criterion, which presently is filtered for the value "May 12, 2022". The data sets filtered by this criterion are displayed in groups per attribute A2 "project". Accordingly, this view results in a presentation of the data sets filtered for attribute A1 in a row group view. The output view AS3 provides for an input mask comprising two input fields EF for each value of the group "project". By assigning the input masks to the individual projects the input effort for a user to generate a new data set is reduced to entering two attributes A3 and A4, i.e. "staff member" and "working hours". In case the user enters input field assigned to the project "Repair Valley Road" a staff member from relation R3—e.g. via a drop down menu offered to the user—and a value for the working hours, the new data set is automatically completed with the filter value "May 12, 2022" for attribute A1 and the value "Repair Valley Rd." for the attribute "project". The dashed arrows again indicated which attribute values (A1 and A2) computer implemented complete the new data set.

Figure 9:
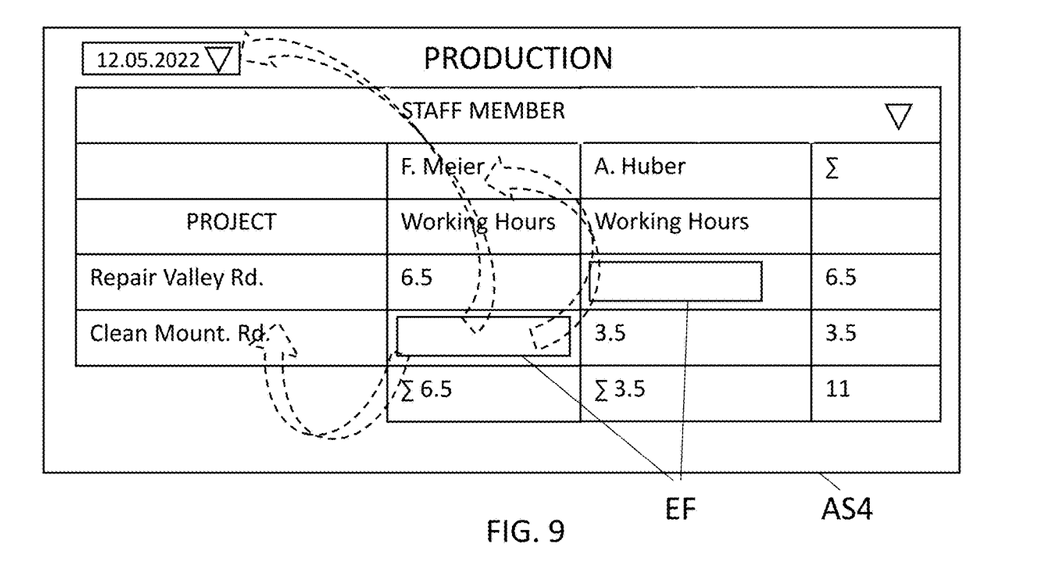

FIG. 9 illustrates a further output view AS4 which is a matrix view. Again, the data sets are first filtered for attribute A1, presently again for the date "May 12, 2022". The data sets filtered according to this criterion are now displayed in form of a matrix with one of the attributes defining the columns, i.e. attribute A3 "staff member", and another one of the attributes the rows, i.e. the attribute A2 "project". Accordingly, the individual values of attribute A3 define the columns while the individual values of the attribute A2 define the rows. Presently, the output view is implemented such that only such "staff members" and "projects" define columns and rows that show up in the filtered data sets. In a different embodiment, all available/defined "staff members" and "projects" from relations R2 and R3 define the columns and rows. This embodiment is optimized for entering new data sets, however, it requires a bigger layout for the output view AS4. Thanks to the possibility of adding row and column groups which may be added or removed by way of a click, only the portion of the matrix may be displayed which is relevant for the entry of new data. For example, the staff members may additionally be grouped into teams, and the projects may additionally be group according to cost centres or still active projects.

Owed to the matrix view, the cells of the matrix of output view AS4 are assigned to attribute A4 "working hours". This output view AS4 provides an input field for all free matrix cells. The possible input fields EF are illustrated in FIG. 9 by way of frames. By way of output view AS4 an input field EF is assigned to an individual project and an individual staff member which reduces the input effort for a user for generating a new data set to a single attribute A4, i.e. "working hours". In case the user enters in one of the input fields, e.g. the input field EF assigned to F. Meier, a working hour value, the new data set is computer assisted generated as follows: A4 according to the user entry, A2 and A3 according to the assignment of the input filed EF to a specific staff member and to a specific project. The dashed arrows again indicate, which attribute values (A1, A2, A3) are automatically picked from where.

Figure 10:
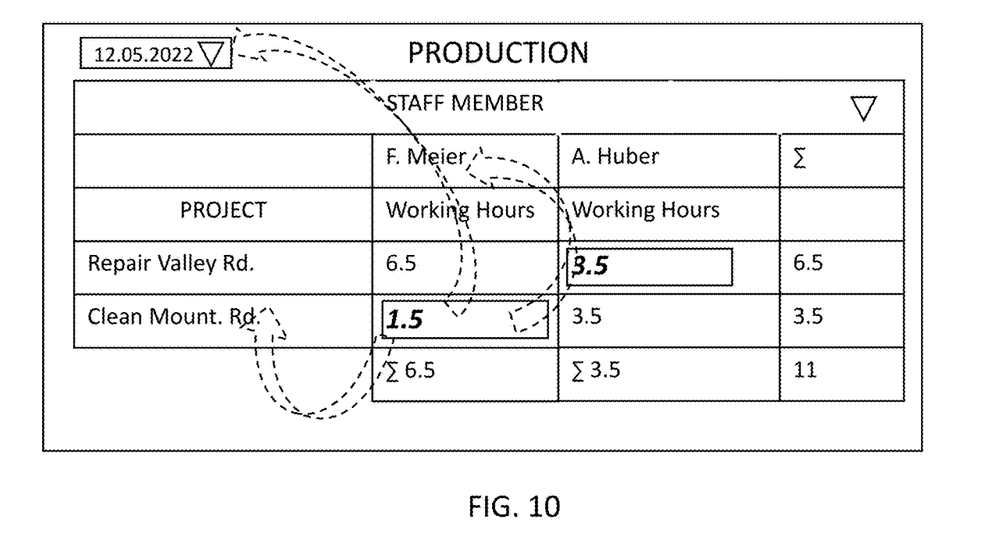

FIG. 10 illustrates by way of example the generation of two new data sets in output view AS4 of FIG. 9. The user enters values 1.5 and 3.5 working hours in the two input fields. As a result, two new data sets are generated and are completed automatically as described in connection with FIG. 9. The point in time for generating a new data set may e.g. be defined by pressing the enter key after the manual entry of the value into the input field. Additional actions may be triggered in response to the entry/pressing the enter key. Preferably, the sum fields in the output view AS4 are updated accordingly.

Figure 11:
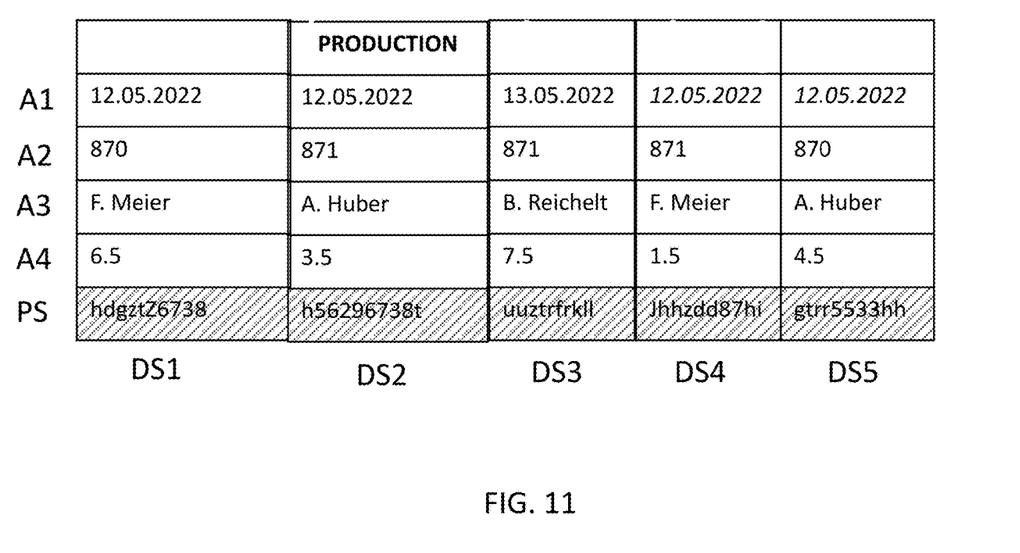
FIG. 11 illustrates an example of a specific relation after application of the method by means of one of the output views as shown in FIGS. 7 to 10.

FIG. 11 illustrates the generation of the two new data sets in the primary relation, which two new data sets are generated by means of the output view according to FIG. 10. The data sets DS4 and DS5 are automatically generated by way of entering only a single attribute value for attribute A4 per data set. Data sets DS4 and DS 5 supplement existing data sets DS1 to DS3. For generating the two new data sets DS4 and DS5, wherein each data set comprises four attributes, the user is required to enter or operate only two input fields instead of eight.

Figure 12:
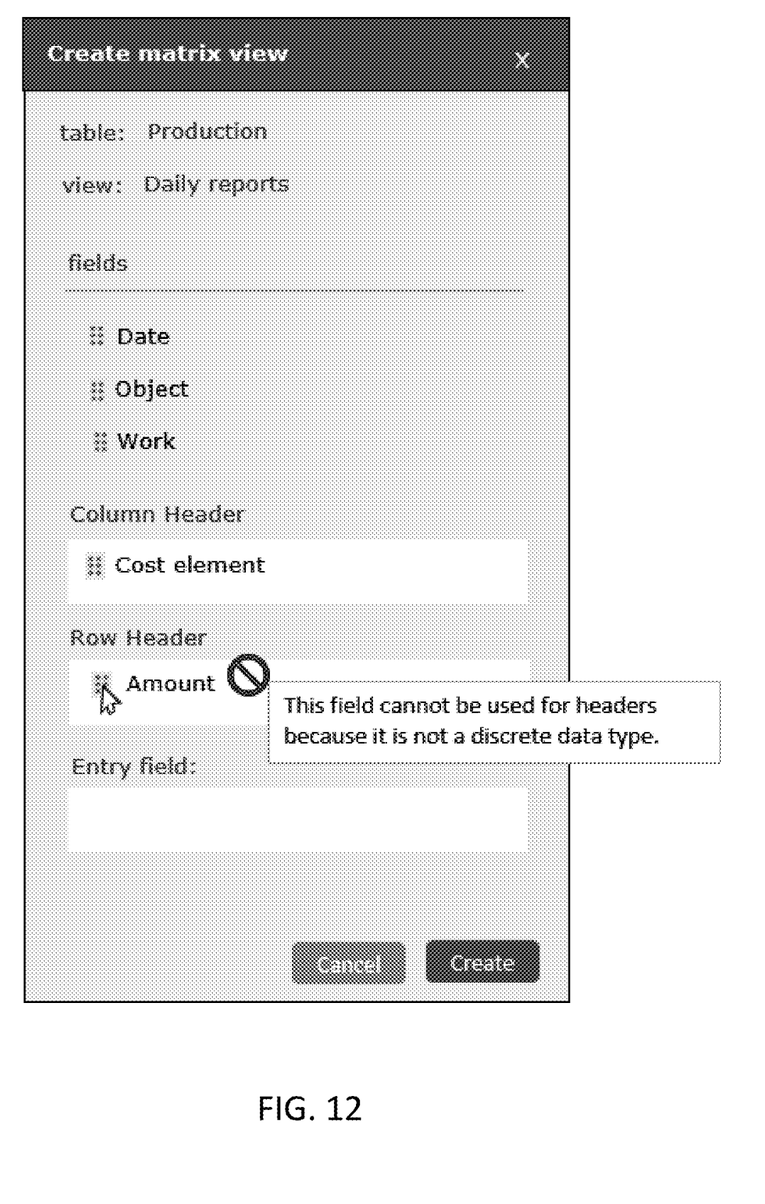
FIG. 12 illustrates a GUI of an editor for editing an output view according to an embodiment of the present invention.

FIG. 12 illustrates a GUI of an editor for editing an output view. In this embodiment, the output view if defined as matrix view. The attributes of the data sets/primary relation are defined as "fields". The matrix view requires to set columns, rows and cells. For example, it is determined in the algorithm of the editor that the columns and rows are exclusively to be assigned to attributes of the discrete data type. Presently, the user attempts to assign attribute "amount" to the rows of the matrix view which attribute is of floating point type, i.e. not a discrete data type in this example. Accordingly, the user is notified that an assignment of this attribute to the rows is not possible.

The invention claimed is:
1. A method for writing data sets into a relational database, the method comprising:
one of providing and generating multiple relations in the database including a primary relation, each relation comprising at least one attribute, and the primary relation comprising at least four attributes,
wherein at least one of the attributes of the primary relation requires values of a non-discrete data type, which the non-discrete data type requires the corresponding attribute to accept values out of a non-finite, non-predefined set of values,
wherein all other attributes of the primary relation require values of a discrete data type, which the discrete data type requires the corresponding attribute to exclusively accept values out of a finite, predefined set of values,
wherein the data sets each comprises values for all attributes of the primary relation of the relational database;
by means of a graphical user interface (GUI), determining at least one value for at least one of the attributes as criterion for filtering the data sets by this attribute value,
wherein the attribute serving as filter criterion is an attribute for values of the discrete data type;
computer implemented outputting data sets filtered by the attribute value in an output view and providing an input field in the output view for entering a value for another one of the attributes of the primary relation, wherein the output view is a matrix view, wherein the values of a further of the attributes of the discrete data type define columns of a matrix in the output view, wherein the values of a third of the attributes of discrete data type define rows of the matrix in the output view, wherein the attribute values of the non-discrete data type of the filtered data sets are output in cells of the matrix assigned to the value of the data set defining a column and assigned to the value of the data set defining a row, wherein all cells of the matrix not occupied by values of the non-discrete data type of the corresponding attribute serve as input fields, wherein the output view is editable by means of an editor for assigning the values of the further attributes to the columns of the matrix and the values of the third of the attributes to the rows of the matrix;

in response to entering a value in the input field of the output view, computer implemented generating a complete data set including the value set as filter criterion for the corresponding attribute and the entered value for the corresponding attribute; and storing the generated complete dataset in the relational database.

2. The method according to claim 1, comprising generating the complete data set additionally comprising one or more values of at least a further one of the attributes, the assignment of the one or more values of at least the further one of the attributes resulting from arrangement of the input field in the output view.

3. The method according to claim 1, comprising after generating the complete data set, comparing the generated complete data set with the data sets stored in the relational database; and storing the generated complete data set in the relational database only in case the comparison does not identify an identical data set presently stored in the relational database, else outputting in the output view that the generated complete data set is not stored in the relational database.

4. The method according to claim 1, wherein a tuple of the primary relation represents a data set, wherein the primary relation comprises a primary key in addition to the at least four attributes, and wherein a primary key value identifies a corresponding data set.

5. The method according to claim 4, wherein the primary key is a combined primary key based on attributes of the discrete data type, wherein the primary key value is determined for all data sets stored in the database and is stored in the primary relation, and wherein the primary key value is determined for the generated complete data set from the attributes of the discrete data type, and is compared to the primary key values of the stored data sets as to identity, such that in case of identity the generated complete data set already is identically stored in the relational database.

6. The method according to claim 1, wherein exactly a single of the attributes of the primary relation requires values of the non-discrete data type.

7. The method according to claim 1, wherein the assignment of the values of the further attributes to the columns of the matrix and the assignment of the values of the third of the attributes to the rows of the matrix are performed by means of a drag and drop operation.

8. The method according to claim 1, wherein only attributes of the discrete data type are offered to a user for an assignment to the rows and columns of the matrix by means of the editor.

9. A non-transitory computer readable medium storing machine readable instructions that when executed by a processor implement a method for writing data sets into a relational database the method comprising:

one of providing and generating multiple relations in the database including a primary relation, each relation comprising at least one attribute, and the primary relation comprising at least four attributes, wherein at least one of the attributes of the primary relation requires values of a non-discrete data type, which the non-discrete data type requires the corresponding attribute to accept values out of a non-finite, non-predefined set of values, wherein all other attributes of the primary relation require values of a discrete data type, which the discrete data type requires the corresponding attribute to exclusively accept values out of a finite, predefined set of values, wherein the data sets each comprises values for all attributes of the primary relation of the relational database;

via a GUI, determining at least one value for at least one of the attributes as criterion for filtering the data sets by this attribute value, wherein the attribute serving as filter criterion is an attribute for values of the discrete data type;

outputting data sets filtered by the attribute value in an output view and providing an input field in the output view for entering a value for another one of the attributes of the primary relation, wherein the output view is a matrix view, wherein the values of a further of the attributes of the discrete data type define columns of a matrix in the output view, wherein the values of a third of the attributes of discrete data type define rows of the matrix in the output view, wherein the attribute values of the non-discrete data type of the filtered data sets are output in cells of the matrix assigned to the value of the data set defining a column and assigned to the value of the data set defining a row, wherein all cells of the matrix not occupied by values of the non-discrete data type of the corresponding attribute serve as input fields, wherein the output view is editable by means of an editor for assigning the values of the further attributes to the columns of the matrix and the values of the third of the attributes to the rows of the matrix;

in response to entering a value in the input field of the output view, generating a complete data set including the value set as filter criterion for the corresponding attribute and the entered value for the corresponding attribute; and storing the generated complete data set in the relational database.

10. A computer system comprising:

a hardware processing unit to write data sets into a relational database;

storage to store computer program code, wherein the processing unit executes the computer program code to perform a method comprising:

one of providing and generating multiple relations in the database including a primary relation, each relation comprising at least one attribute, and the primary relation comprising at least four attributes, wherein at least one of the attributes of the primary relation requires values of a non-discrete data type, which the non-discrete data type requires the corresponding attribute to accept values out of a non-finite, non-predefined set of values, wherein all other attributes of the primary relation require values of a discrete data type, which the discrete data type requires the corresponding attribute to exclusively accept values out of a finite, predefined set of values, wherein the data sets each comprises values for all attributes of the primary relation of the relational database;

via a graphical user interface (GUI), determining at least one value for at least one of the attributes as criterion for filtering the data sets by this attribute value, wherein the attribute serving as filter criterion is an attribute for values of the discrete data type;

outputting data sets filtered by the attribute value in an output view and providing an input field in the output view for entering a value for another one of the attributes of the primary relation, wherein the output view is a matrix view, wherein the values of a further of the attributes of the discrete data type define columns of a matrix in the output view, wherein the values of a third of the attributes of discrete data type define rows of the matrix in the output view, wherein the attribute values of the non-discrete data type of the filtered data sets are output in cells of the matrix assigned to the value of the data set defining a column and assigned to the value of the data set defining a row, wherein all cells of the matrix not occupied by values of the non-discrete data type of the corresponding attribute serve as input fields, wherein the output view is editable by means of an editor for assigning the values of the further attributes to the columns of the matrix and the values of the third of the attributes to the rows of the matrix;

in response to entering a value in the input field of the output view, generating a complete data set including the value set as filter criterion for the corresponding attribute and the entered value for the corresponding attribute; and storing the generated complete dataset in the relational database.

* * * * *